United States Patent [19]

Hackmack et al.

[11] 3,883,654

[45] May 13, 1975

[54] BASIC QUINOBENZAZEPINES COMPOSITIONS AND METHODS OF USE

[75] Inventors: Gerhard Hackmack, Aumuhle; Heinz Gunter Menge, Dettingen, both of Germany

[73] Assignee: Byk Gulden Lomberg Chemische Fabrik GmbH, Konstanz, Germany

[22] Filed: Feb. 21, 1974

[21] Appl. No.: 444,427

Related U.S. Application Data

[63] Continuation-in-part of Ser. No. 112,046, Feb. 2, 1971, Pat. No. 3,830,818.

[30] Foreign Application Priority Data

Feb. 3, 1970 Germany.............................. 2004818

[52] U.S. Cl. ................................................ 424/258
[51] Int. Cl............................................. A61k 27/00
[58] Field of Search........................... 424/244, 258

*Primary Examiner*—Stanley J. Friedman
*Attorney, Agent, or Firm*—Irwin M. Aisenberg

[57] ABSTRACT 2,3,7,8-Tetrahydro-1H-quino[1,8-ab][1]benzazepine compounds which are substituted in 3-position by an amino group and their substantially non-toxic acid addition salts have a pronounced effect on the central nervous system.

11 Claims, No Drawings

BASIC QUINOBENZAZEPINES COMPOSITIONS AND METHODS OF USE

The subject application is a continuation-in-part of the co-pending application Ser. No. 112,046 filed on Feb. 2nd, 1971, and now U.S. Pat. No. 3,830,818.

BACKGROUND OF THE INVENTION

1. Field of the Invention

The present invention relates to new and valuable quinobenzazepine compounds and more particularly to 2,3,7,8-tetrahydro-1H-quino[1,8-ab][1]benzazepine compounds substituted by a basic group, to a process of producing such compounds, to pharmaceutical compositions containing same, and to a method of using such compositions in therapy.

2. Description of the Prior Art

Heretofore, of basically substituted derivatives of 1H-quino[1,8-ab][1] benzazepine there have become known only ether-like 3-(dialkylamino alkoxy)-1-oxo-7,8-dihydro-1H-[1,8-ab]benzazepine compounds. See, for instance Monatsh. Chem. vol. 93, pages 26 to 33 (1962); U.S. Pat. No. 3,052,678; British Pat. No. 912,289. These known compounds have a number of disadvantages so that they did not find use in therapy.

SUMMARY OF THE INVENTION

It is one object of the present invention to provide new and valuable 2,3,7,8-tetrahydro-1H-quino [1,8-ab][1]benzazepine compounds which are substituted by a basic group.

Another object of the present invention is to provide a simple and effective method of producing such new and valuable benzazepine compounds.

A further object of the present invention is to provide pharmaceutical compositions containing such benzazepine compounds as active agents.

Still another object of the present invention is to provide an effective method of using such benzazepine compounds and compositions containing same in therapy.

Other objects of the present invention and advantageous features thereof will become apparent as the description proceeds.

In principle the new and valuable benzazepine compounds according to the present invention are 2,3,7,8-tetrahydro-1H-quino[1,8-ab][1]benzazepines of the following Formula I

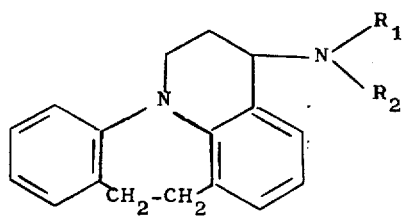

In said Formula I $R_1$ and $R_2$ indicate hydrogen or straight-chain or branched alkyl with 1 to 4 carbon atoms whereby $R_1$ and $R_2$ can be the same or different substituents.

The present invention also comprises the pharmacologically acceptable, substantially non-toxic acid-addition salts of said benzazepine compounds.

It has been found that the benzazepine compounds of Formula I and their acid-addition salts possess surprising and valuable pharmacological properties so that they can be used with great advantage in therapy. The 2,3,7,8-tetrahydro-1H-quino[1,8-ab][1]benzazepine compounds according to the present invention which are substituted by an amino, a monoalkyl, or a dialkylamino group exhibit a pronounced effect upon the central nervous system. They possess typical neuroleptic properties and, in addition thereto, some thymoleptic effects.

In contrast to the well known tranquilizing agents promazine, and perazine and new benzazepine compounds according to the present invention also produce thymoleptic effects. Furthermore, they have analgesic and spasm inhibitory properties and rather pronounced effects in the peripheral-vegetative field.

The compounds of Formula I are preferably prepared by reacting 3-oxo-2,3,7,8-tetrahydro-1H-quino[1,8-ab][1]benzazepine of Formula II

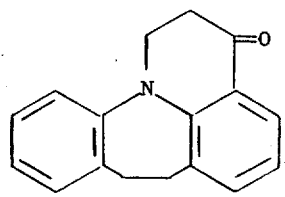

with an amino compound of Formula III

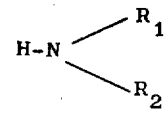

wherein $R_1$ and $R_2$ are the same substituents as indicated above.

a. According to a preferred embodiment of this invention the reactants are condensed and simultaneously hydrogenated, i.e., subjected to hydrogenating condensation in a single reaction step.

b. The reactants are condensed whereby water is split off. Thereby the corresponding imino compound of Formula IV is formed

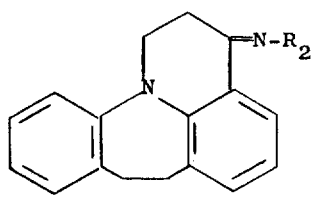

The resulting imine of Formula IV is then reduced to the corresponding amino compound of Formula I, for instance by catalytical hydrogenation.

c. The compound of Formula II is reacted with hydroxylamine to yield the oxime of Formula V

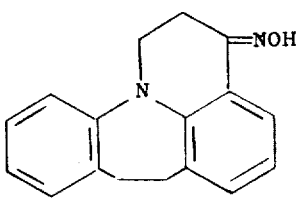

The resulting oxime of Formula V is then reduced to the corresponding amino compound of Formula I, wherein $R_1$ and $R_2$ are hydrogen, by catalytic hydrogenation or by reduction with an alkali metal amalgam, for instance, sodium amalgam.

According to another embodiment of the present invention it is possible to produce the benzazepine compounds of Formula I by reacting 3-halogeno-2,3,7,8-tetrahydro-1H-quino[1,8-ab][1]benzazepine compounds of Formula VI

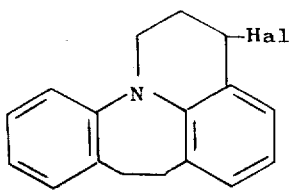

with ammonia or a primary or secondary amine, i.e., a compound of Formula III.

The above described processes are preferably carried out in a suitable solvent, for instance, in alcohols and, if required, under pressure.

The hydrogen atoms of the compounds of Formula I wherein at least one of the substituents $R_1$ and $R_2$ is hydrogen, can subsequently be alkylated to yield compounds wherein one or both said substituents $R_1$ and $R_2$ are alkyl with 1 to 4 carbon atoms. If both $R_1$ and $R_2$ substituents are hydrogen, the alkylation can be carried out in such a manner that first one hydrogen atom is replaced by alkyl and thereafter the other hydrogen atom. Or both hydrogen atoms can be alkylated simultaneously.

The benzazepine compounds of Formula I are preferably administered in the form of their pharmaceutically acceptable, substantially non-toxic acid-addition salts. These salts are produced by methods known to the art, for instance, by dissolving the base in a suitable solvent wherein the respective salt is insoluble and adding thereto the corresponding acid, which may also be dissolved in a suitable solvent. Of course, not only acid, addition salts with inorganic acids such as the hydrochlorides, hydrobromides, sulfates, nitrates, phosphates, and others, can be produced but also acid addition salts with organic acids, such as the salts with acetic acid, propionic acid, and other alkanoic acids, maleic acid, fumaric acid, lactic acid, citric acid, malic acid, tartaric acid, succinic acid, glycine, alanine, and other amino acids, benzoic acid, salicylic acid, phthalic acid, furoic acid, nicotinic acid, isonicotinic acid, and others.

DESCRIPTION OF THE PREFERRED EMBODIMENTS

The following examples serve to illustrate the present invention without, however, limiting the same thereto.

EXAMPLE 1

3-Amino-2,3,7,8-tetrahydro-1H-quino[1,8-ab][1]benzazepine; Formula I: $R_1$ and $R_2$ = H.

Twenty grams of 3-oxo-2,3,7,8-tetrahydro-1H-quino[1,8-ab][1]benzazepine (Formula III) are dissolved in 560 cc. of absolute alcohol. A solution of 18.5 g. of hyhdroxylamine hydrochloride in 66 cc. of water and thereafter, 7.6 cc. of pyridine are added to said alcoholic solution. The resulting mixture is heated under reflux for 6 hours. After cooling, the reaction solution is poured into 2.1 of water. Thereby, the oxime (Formula V) crystallizes. It is filtered off by suction, washed with water, and dried. The yield is 21 g. The melting point of the oxime is 198°–200° C.

The oxime is dissolved in 100 cc. of dimethylformamide. 900 cc. of a methanol solution saturated with ammonia at 0° C. are added thereto. The mixture is hydrogenated for 4 hours at about 80° C. and a hydrogen pressure of 96 atmospheres gauge with the addition of 40 g. of Raney nickel catalyst. The catalyst is filtered off through a kieselguhr filter. The filtrate is concentrated by evaporation in a vacuum. A darkly colored oil remains. Pure 3-amino-2,3,7,8-tetrahydro-1H-quino[1,8-ab][1]benzazepine is obtained therefrom by fractional distillation in a high vacuum. The yield is 80 percent. The oil has a boiling point of 128°–132°C./0.01 mm. Hg.

The hydrochloride of said compound is obtained by adding an ethereal hydrochloric acid solution to its solution in isopropanol in an amount sufficient to produce a weakly acid reaction of the mixture. The melting point of the hydrochloride is 202°–203° C. after recrystallization from ethanol.

EXAMPLE 2

3-Methylamino-2,3,7,8-tetrahydro-1H-quino[1,8-ab][1]benzazepine; Formula I: $R_1$=H, $R_2$=CH$_3$.

150 g. of 3-oxo-2,3,7,8-tetrahydro-1H-quino[1,8-ab][1]benzazepine (Formula II) are dissolved in 1 l. of anhydrous benzene. 10 g. of anhydrous ammonium acetate are added to said solution. The mixture is heated for about 7 hours while stirring and continuously introducing methylamine and separating and removing the water formed on reaction from the refluxing benzene. Thereafter, the solvent is distilled off in a vacuum. The resulting condensation product remains in the form of an oil.

It is dissolved in 300 cc. of methanol. 560 cc. of a methanol solution saturated with methylamine at 0° C., are added thereto. The mixture is hydrogenated in an autoclave with the addition of 60 g. of Raney nickel catalyst at 80° C. and a hydrogen pressure of 110 atm. gauge. The catalyst is filtered off through a kieselguhr filter. The filtrate is completely concentrated by evaporation in a vacuum. Thereby, 149 g. of a dark, highly viscous oil remain. 3-Methylamino-2,3,7,8-tetrahydro-1H-quino[1,8-ab][1]benzazepine is obtained therefrom by distillation in a high vacuum. The yield is 86 percent. The boiling point of the oil is 155°–160° C./0.01 mm. Hg.

Addition of an isopropanol solution saturated with fumaric acid to the solution of the oil in isopropanol yields the fumarate of said 3-methylamino benzazepine compound. It melts at 184°–186° C. after recrystallization from dimethylformamide.

EXAMPLE 3

3-ethylamino-2,3,7,8-tetrahydro-1H-quino-[1,8-ab][1]benzazepine; Formula I: $R_1$=H, $R_2$=$C_2H_5$.

The procedure is the same as described hereinabove in Example 2 whereby 25 g. of 3-oxo-2,3,7,8-tetrahydro-1H-quino[1,8-ab][1]benzazepine are condensed and hydrogenated with ethylamine as the other reactant in place of methylamine. 22 g. of 3-ethylamino-2,3,7,8-tetrahydro-1H-quino[1,8-ab][1]benzazepine are obtained thereby in the form of an oil boiling at 140°–144° C./0.01 mm. Hg.

Its hydrochloride is obtained by adding an ethereal solution of hydrochloric acid to the isopropanol solution of said compound in an amount sufficient to produce a weakly acid reaction in the reaction mixture. The salt is recrystallized from a mixture of acetone and ethanol (1:1). The melting point of the hydrochloride is 167°–168° C.

EXAMPLE 4

3-Propylamino-2,3,7,8-tetrahydro-1H-quino[1,8-ab][1]benzazepine; Formula I: $R_1$=H, $R_2$=$C_3H_7$.

The procedure is the same as described hereinabove in Example 2 whereby 10 g. of 3-oxo-2,3,7,8-tetrahydro-1H-quino[1,8-ab][1]benzazepine are condensed and hydrogenated with propylamine as the other reactant in place of methylamine. 8 g. of 3-propylamino-2,3,7,8-tetrahydro-1H-quino[1,8-ab][1]benzazepine are obtained thereby in the form of an oil boiling at 170°–173° C./0.01 mm. Hg.

Said compound yields a hydrochloride which melts at 174°–175.5° C. on recrystallization from a mixture of isopropanol and ethanol (1:1).

EXAMPLE 5

3-Propylamino-2,3,7,8-tetrahydro-1H-quino[1,8-ab][1]benzazepine is also produced by dissolving 7.5 g. of 3-bromo-2,3,7,8-tetrahydro-1H-quino[1,8-ab][1]benzazepine in 450 cc. of absolute toluene and heating the solution under reflux with 42 g. of n-propylamine for 10 hours. After distilling off the toluene in a vacuum, the residue is treated with ether and 2 N hydrochcloric acid in order to remove neutral compounds. The ethereal phase is separated and the aqueous acid phase is rendered alkaline by the addition of sodium hydroxide solution. The separated base is extracted with ether. On drying and evaporating the ether, the 3-propylamino-2,3,7,8-tetrahydro-1H-quino[1,8-ab][1]benzazepine is obtained in the form of an oil.

Its hydrochloride is obtained by adding an ethereal solution of hydrochloric acid to the isopropanol solution of said compound in an amount sufficient to produce a weakly acid reaction in the reaction mixture. The salt is recrystallized from isopropanol and has a melting point of 176°–178° C.

EXAMPLE 6

3-secondary Butylamino-2,3,7,8-tetrahydro-1H-quino[1,8-ab][1]benzazepine; Formula I; $R_1$ = H; $R_2$ =secondary butyl.

The procedure is the same as described hereinabove in Example 2 whereby 15 g. of 3-oxo-2,3,7,8-tetrahydro-1H-quino[1,8-ab][1]benzazepine are reacted with 25 g. of secondary butylamine in benzene with the addition of 2 g. of anhydrous sodium acetate by azeotropically heating to boiling the mixture for 9 hours and continuously removing the water from the refluxing benzene. The reaction solution is concentrated by evaporation in a vacuum. The oily residue is hydrogenated for 4.5 hours in 800 cc. of methanol with the addition of 44 g. of secondary butylamine, 2 g. of anhydrous sodium acetate, and Raney nickel catalyst at 85° C. and a hydrogen pressure of 95 atm. gauge. The catalyst is filtered off through a kieselguhr filter. The filtrate is concentrated by evaporation in a vacuum. The residue is dissolved in benzene. The resulting solution is repeatedly extracted with dilute hydrochloric acid. The combined acid extracts are rendered alkaline by the addition of sodium hydroxide solution. The separated base is extracted with ether. The ethereal solution is dried over potassium carbonate and is concentrated by evaporation.

The oily residue is dissolved in isopropanol. Addition of ethereal hydrochloric acid solution directly yields the crystalline hydrochloride of 3-secondary butylamino-2,3,7,8-tetrahydro-1H-quino[1,8-ab][1]benzazepine. On recrystallization from a mixture of acetone and ethanol (1:1), the hydrochloride melts at 180°–181° C.

EXAMPLE 7

3-Isopropylamino-2,3,7,8-tetrahydro-1H-quino[1,8-ab][1]benzazepine; Formula I: $R_1$ = H, $R_2$= isopropyl.

The procedure is the same as described hereinabove in Example 6 whereby 3-oxo-2,3,7,8-tetrahydro-1H-quino[1,8-ab][1]benzazepine is reacted with isopropylamine in place of secondary butylamine. The resulting 3-isopropylamino-2,3,7,8-tetrahydro-1H-quino[1,8-ab][1]benzazepine is obtained in the form of an oil with the boiling point of 150°–160° C./0.01 mm. Hg.

EXAMPLE 8

3-Dimethylamino-2,3,7,8-tetrahydro-1H-quino[1,8-ab][1]benzazepine; Formula I: $R_1$ and $R_2$ = $CH_3$.

8 g. of 3-chloro-2,3,7,8-tetrahydro-1H-quino[1]benzazepine and 55 cc. of dimethylamine are dissolved in 1400 cc. of methanol. The mixture is heated in an autoclave to 140° C. for 4 hours. Thereafter, the solvent is removed by evaporation, the residue is dissolved in ether, the ethereal solution is extracted with 10 percent hydrochloric acid, and the aqueous acid phase is rendered alkaline by the addition of dilute sodium hydroxide solution. Thereby the base separates in the form of an oil which is extracted with ether. The ethereal solution is dried over potassium carbonate and is evaporated to dryness.

The oily residue is dissolved in isopropanol. On addition of ethereal hydrochloric acid to the resulting solution, the crystalline hydrochloride of 3-dimethylamino-2,3,7,8-tetrahydro-1H-quino[1,8-ab][1]benzazepine is isolated. Its melting point is 203° C. on recrystallization from ethanol.

When proceeding as described hereinabove in Example 8 but replacing dimethylamine by equimolecular amounts of diethylamine, di-n-propylamine, di-n-butylamine, and di-isobutylamine, the corresponding 3-diethylamino-, 3-di-n-propylamino-, 3-di-n-butylamino and, 3-di-isobutylamino-2,3,7,8- tetrahydro-1H-quino[1,8-ab][1]benzazepine compounds are obtained in the form of their crystalline hydrochlorides.

PHARMACEUTICAL COMPOSITIONS

As stated above, the basically substituted 2,3,7,8-tetrahydro-1H-quino[1,8-ab][1]benzazepine compound of Formula I according to the present invention are preferably administered orally. Compositions for oral administration comprise, for instance, tablets, pills, dragees, lozenges, and the like shaped preparations. The compounds may also be administered in powder or granulated form, preferably enclosed in gelatin and the like capsules. Oral administration in liquid form, such as in the form of emulsions, suspensions, sirups, and the like is also possible. These solid and liquid preparations are produced in a manner known to the art of compounding and processing pharmaceutical compositions. The novel compositions are suitably presented in unit dosage form, whereby each unit contains a predetermined amount of the benzazepine compound as required to produce the desired therapeutic effect.

For preparing the solid compositions, the basically substituted 2,3,7,8-tetrahydro-1H-quino[1,8-ab][1]benzazepine compounds according to the present invention are mixed with conventional carriers and excipients, such as diluting agents, binding agents, lubricants and, expanding agents, for instance, with glucose, lactose, mannitose, corn starch, potato starch, dextrin, talc, kaolin, magnesium hydroxide, magnesium carbonate, bentonite, magnesium trisilicate, pectin, gelatin, agar, stearic acid, magnesium stearate, calcium stearate, gums, and others.

The tablets, pills, or other shaped compositions may be provided with an enteric coating which resists disintegration in the stomach but releases the active agent in the intestines. A number of materials are used for such enteric coatings, such as shellac, cellulose acetate phthalate and others.

The new pharmaceutical compositions contain, as a rule, 1 to 95 percent by weight of the new active ingredients.

The following examples serve to illustrate pharmaceutical compositions containing the basically substituted 2,3,7,8-tetrahydro-1H-quino[1,8-ab][1]benzazepine compounds according to the present invention without being limited thereto.

EXAMPLE 9

Tablets:

Composition:

100 g. of 3-amino-2,3,7,8-tetrahydro-1H-quino[1,8-ab][1]benzazepine hydrochloride
250 g. of corn starch
485 g. of lactose,
200 g. of talc,
25 g. of magnesium stearate, and
15 g. of gelatin.

The benzazepine compound is intimately mixed with the corn starch and lactose, granulated with 10 percent gelatin solution in water, passed through a No. 8 screen, and dried. The dried granules are thoroughly mixed with the talc and the magnesium stearate and compressed into tablets, each weighing about 250 mg. and containing 25 mg. of 3-amino-2,3,7,8-tetrahydro-1H-quino[1,8-ab][1]benzazepin. One tablet is administered four times daily in the treatment of patients afflicted with minor depressions or depressive disorders.

EXAMPLE 10

The 3-amino-2,3,7,8-tetrahydro-1H-quino[1,8-ab]['b]benzazepine hydrochloride of Example 9 is replaced by equal amounts of acid-addition salts of other basically-substituted 2,3,7,8-tetrahydro-1H-quino [1,8-ab][1]benzazepines (according to the present invention), such as 3-methylamino-2,3,7,8-tetrahydro-1H-quino[1,8-ab][1]benzazepine fumarate,
3-ethylamino-2,3,7,8-tetrahydro-1H-quino[1,8-ab][1]benzazepine hydrochloride,
3-n-propylamino-2,3,7,8-tetrahydro-1H-quino[1,8-ab][1]benzazepine hydrochloride,
3-isopropylamino-2,3,7,8-tetrahydro-1H-quino[1,8-ab][1]benzazepine hydrochloride
3-n-butylamino-2,3,7,8-tetrahydro-1H-quino[1,8-ab][1]benzazepine hyrochloride,
3-isobutylamino-2,3,7,8-tetrahydro-1H-quino[1,8-ab][1]benzazepine hydrochloride,
3-secondary butylamino-2,3,7,8-tetrahydro-1H-quino[1,8-ab][1]benzazepine hydrochloride,
3-dimethylamino-2,3,7,8-tetrahydro-1H-quino[1,8-ab]]1]benzazepine hydrochloride,
3-diethylamino-2,3,7,8-tetrahydro-1H-quino[1,8-ab][1]benzazepine hydrochloride, and the acid-addition salts of other 3-amino-2,3,7,8-tetrahydro-1H-quino[1,8-ab]]1]benzazepine of Formula I. Otherwise the procedure is the same as described in Example 9, and the resulting tablets contain about 25 mg. of the active agent per tablet.

EXAMPLE 11

Sugar coated dragees

The tablets obtained according to Examples 9 and 10 are used as cores for making dragees. They are coated by rotating in a coating pan with a sugar solution. Sugar coating is repeated until each dragee has attained a weight of about 300 mg.

EXAMPLE 12

Gelatin capsules 150 g. of 3-dimethylamino-2,3,7,8-tetrahydro-1H-quino[1,8-ab][1]benzazepine hydrochloride are intimately mixed with 1500 g. of corn starch and 50 g. of magnesium stearate. The mixture is filled into two-piece gelation capsules. Each capsule contains 250 mg. of the mixture and 25 mg. of the active 3-dimethylamino-2,3,7,8-tetrahydro-1H-quino[1,8-ab][1]benzazepine. The capsules are given in a dose of 3 to 5 capsules daily in the treatment of patients afflicted with minor depressions or depressive disorders.

Of course, other orally administrable compositions can be prepared according to methods well known to the art. It is also possible to produce liquid compositions by incorporating the active benzazepine compounds into aqueous solutions, suspensions, emulsions, and similar liquid pharmaceutical vehicles whereby, if required, suitable dispersing or suspending agents, such as synthetic and natural gums, for instance, tragacanth, alginates, methyl cellulose, polyvinyl pyrrolidone, dextran, and others, are used.

Rectal administration by means of suppositories is also possible. Such suppositories are prepared by incorporating the active benzazepine compound into a molten conventional suppository base, for instance into cocoa butter, polyoxy ethylene waxes, and others.

PHARMACOLOGICAL TESTS

Pharmacological tests on albino mice and rats with 3-methylamino-2,3,7,8-tetrahydro-1H-quino[1,8-ab][1]benzazepine fumarate of Example 2 and comparative tests with known neuroleptic agents e.g. of the phenothiazine series and anti-depressants such as 5-(α-methylaminopropylidene) dibenzo[a,d]cyclohepta[1,4]diene or 3-(10,11-dihydro-5H-dibenzo[a,d]cyclohepten-5-ylidene)-N,N-dimethylpropylamine, have given the following results:

a. The acute toxicity of the compound according to the present invention is of about the same magnitude as that of known neuroleptic agents, e.g. 10-(3-dimethylaminopropyl)phenothiazine, 10-[(1-methyl-3-piperidyl) methyl]phenothiazine and, 10-[3-(4-methyl-1-piperazinyl) propyl]phenothiazine, and the noted known antidepressants.

b. Its therapeutic index, i.e. the ratio between mean effective dose and $LD_{50}$, is about 1:20 determined by its potentiating effect upon narcosis. This index is about the same as that of known neuroleptic agents, such as 10-(3-dimethylaminopropyl)phenothiazine and, 10-[3-(4-methyl-1-piperazinyl)propyl]phenothiazine and that of the noted known antidepressants.

c. Its intestinal absorption on oral administration is about the same as that of known neuroleptic agents, such as 2-chloro-10-(3-dimethylaminopropyl)phenothiazine and, 10-(3-dimethylaminopropyl)phenothiazine, and the noted know antidepressants, as determined from the ratio of toxicity on intravenous injection as compared with the toxicity on oral administration.

d. In contrast to known neuroleptic agents, such as 10-[3-(4-methyl-1-piperazinyl)propyl]phenothiazine, 2-chloro-10-(3-dimethylaminopropyl)phenothiazine and, 10-(3-dimethylaminopropyl)phenothiazine, the tested compound has thymoleptic activity which is not dependent on the dosis but remains clearly demonstrable even on administration of increased doses as is seen in testing its antagonistic effect against reserpine.

e. It has a pronounced thymoleptic activity as is shown by its potentiating effect on noradrenaline with respect to the blood pressure. All known neuroleptic agents of the phenothiazine series do not potentiate noradrenaline but reduce its effects.

It follows from these and other pharmacological tests that the tested compound according to the present invention is a neuroleptic agent on account of its narcosis potentiating effect. But is has also antidepressant activity due to its reserpine antagonism and its noradrenaline potentiating effect. Thus this compound exhibits an activity which places it between said two groups, the group of neuroleptic agents and the group of antidepressants.

Other compounds according to the present invention exhibit similar properties. The new compounds have also a spasm inhibiting effect, especially with respect to raising the threshold of electroshock and of pentylenetetrazol-induced convulsions and exhibit a musculorelaxant effect, which is more pronounced than that achieved with other antidepressents, such as 5-(α-methylaminopropylidene)dibenzo[a,d]cyclohepta[1,4-]diene or 3-(10,11-dihydro-5H-dibenzo[a,d]cyclohepten-5-ylidene)-N,N-dimethylpropylamine.

CLINICAL TESTS

In conformity with the results obtained in the above described pharmacological tests, the new compounds affect the central nervous system (CNS) of humans and animals and have proved of value in all indications for neuroleptic agents of relatively low activity and for a prolonged neuroleptic treatment, for instance, in improving mental outlook in depressive states, in greatly diminishing anxiety and apprehension, in the relief of pain by producing a calm detachment, and in other instances of mental and emotional disturbances.

Preferably the compounds according to this invention are administered orally in a dose between about 75 mg. and 300 mg. daily subdivided in three to four doses of about 30 mg. to 100 mg. each. This dose corresponds approximately to a dose of from about 1 to about 5 milligrams per kilogram of bodyweight.

In virtue of these valuable pharmacological properties the new compounds, while exhibiting such antipsychotic and psychoneurotic effects, are useful in the treatment of mental depressions, of psychoneurotic states, especially with anxiety and tensions, of chronic schizophrenia in combination with psychotherapy. Administration of the new compounds to a subject afflicted with such disorders causes mood elevation, diminuation of agitation in cases of agitated depressions, relief of tensions, and anxiolytic effects.

Of course, the new compounds could be used in therapy in combination with minor tranquillizers, e.g., of the benzodiazepine series, e.g., in combination with 7-chloro-1,3-dihydro-3-hydroxy-5-phenyl-2H-1,4-benzodiazepin-2-one, 1,3-dihydro-7-nitro-5-phenyl-2H-1,4-benzodiazepin-2-one, 7-chloro-2-methylamino-5-phenyl-3H-1,4-benzodiazepin-4-oxide, 7-chloro-3-carboxy-1,3-dihydro-2,2-dihydroxy-5-phenyl-2H-1,4-benzodiazepine, 7-chloro-1-(cyclopropylmethyl)-1,3-dihydro-5-phenyl-2H-1,4-benzodiazepin-2-one and 7-chloro-5-phenyl-3H-1,4-benzodiazepin-2-(1H)-one. Combinations with muscle relaxants of the dicarbamate series, e.g., with 1-carbamoyloxy-3-phenylpropane or 2,2-di(carbamoyloxymethyl)pentane, have been proved of value in therapy.

These noted combinations are used successfully in the amplification of the sedation in the beginning of the therapy of cyclothymic depressions and in the ambulatory treatment of senile depressions or psychoneurotic anxieties or tensions.

STARTING MATERIALS

3-Oxo-2,3,7,8-tetrahydro-1H-quino[1,8-ab][1]benzazepine of Formula II is obtained by conventional ring closure of the compound of the Formula VII

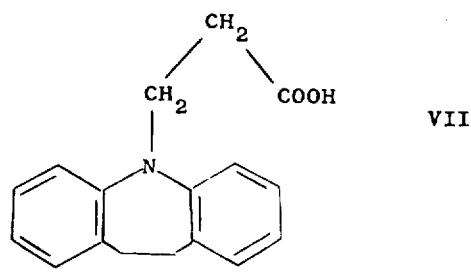

VII by means of zinc chloride and a mixture of acetic acid anhydride and glacial acetic acid.

3-Halogeno-2,3,7,8-tetrahydro-1H-quino[1,8-ab][1]benzazepines of Formula VI are obtained by catalytically hydrogenating the carbonyl group in said compound of Formula II to the corresponding carbinol of Formula VIII and replacing the hydroxyl group therein by halogen in a manner known per se according to the following reaction scheme:

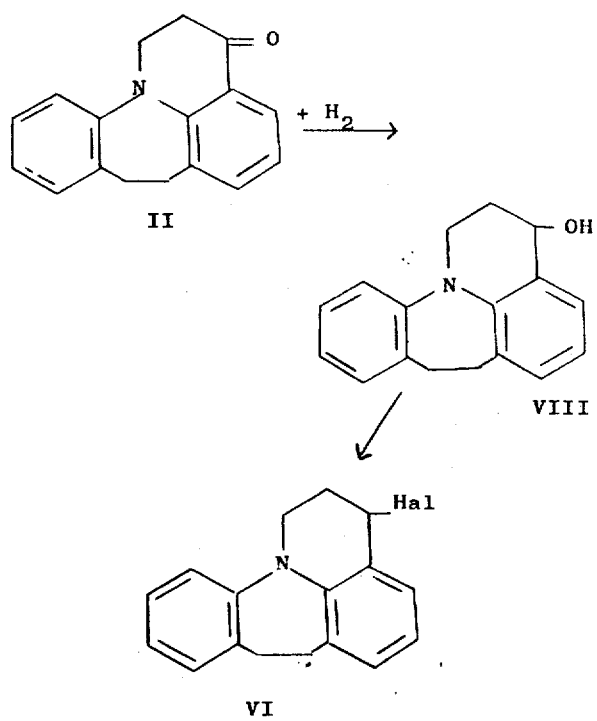

We claim:

1. A pharmaceutical composition containing a pharmaceutical carrier and, as active agent, a pharmacologically-active concentration of a 2,3,7,8-tetrahydro-1H-quino[1,8-ab][1]benzazepine compound selected from the group consisting of a 3-amino-2,3,7,8-tetrahydro-1H-quino[1,8-ab][1]benzazepine of the formula

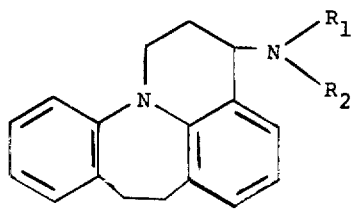

wherein each of $R_1$ and $R_2$ is a member selected from the group consisting of hydrogen and alkyl with 1 to 4 carbon atoms, and the pharmaceutically-acceptable acid-addition salt thereof.

2. A pharmaceutical composition of claim 1 in orally-administrable form.
3. A pharmaceutical composition of claim 1, wherein each of $R_1$ and $R_2$ is hydrogen.
4. A pharmaceutical composition of claim 1 containing from 1 to 95 percent by weight of the active agent.
5. A pharmaceutical composition of claim 1 wherein $R_1$ is hydrogen and $R_2$ is methyl.
6. A pharmaceutical composition of claim 1 wherein $R_1$ is hydrogen and $R_2$ is ethyl.
7. A pharmaceutical composition of claim 1 wherein $R_1$ is hydrogen and $R_2$ is propyl.
8. A pharmaceutical composition of claim 1 wherein $R_1$ is methyl and $R_2$ is methyl.
9. A pharmaceutical composition of claim 1 wherein the amount of the active agent, in unit dosage form, is sufficient to produce an antidepressive effect on a host, to which it is administered, afflicted with minor depression or depressive disorder.
10. In a method of affecting the central nervous system of a human or other animal host, the step of administering to such host an amount, which is therapeutically effective to impart a neuroleptic, thymoleptic, analgesic, anti-spasmodic, anti-depressant and/or peripheral-vegetative field effect of a 2,3,7,8-tetrahydro-1H-quino[1,8-ab][1]benzazepine compound selected from the group consisting of a 3-amino-2,3,7,8-tetrahydro-1H-quino[1,8-ab][1]benzazepine of the formula wherein each of $R_1$ and $R_2$ is a member selected from the group consisting of hydrogen and alkyl with from 1 to 4 carbon atoms, and a pharmaceutically-acceptable acid-addition salt thereof.

11. A method of claim 10, wherein the 3-amino-2,3,7,8-tetrahydro-1H-quino[1,8-ab][1]benzazepine compound is administered orally.

* * * * *